(12) United States Patent
Gorissen et al.

(10) Patent No.: US 10,256,970 B2
(45) Date of Patent: Apr. 9, 2019

(54) SECURE DATA TRANSFORMATIONS

(71) Applicant: KONINKLIJKE PHILIPS N.V., Eindhoven (NL)

(72) Inventors: Paulus Mathias Hubertus Mechtildis Antonius Gorissen, Eindhoven (NL); Ludovicus Marinus Gerardus Maria Tolhuizen, Waalre (NL)

(73) Assignee: KONNKLIJKE PHILIPS N.V., Eindhoven (NL)

( * ) Notice: Subject to any disclaimer, the term of this patent is extended or adjusted under 35 U.S.C. 154(b) by 334 days.

(21) Appl. No.: 15/105,872

(22) PCT Filed: Dec. 11, 2014

(86) PCT No.: PCT/EP2014/077301
§ 371 (c)(1),
(2) Date: Jun. 17, 2016

(87) PCT Pub. No.: WO2015/091172
PCT Pub. Date: Jun. 25, 2015

(65) Prior Publication Data
US 2016/0323099 A1    Nov. 3, 2016

(30) Foreign Application Priority Data

Dec. 20, 2013    (EP) .................................... 13198922

(51) Int. Cl.
*H04L 9/06* (2006.01)
(52) U.S. Cl.
CPC ........ *H04L 9/0618* (2013.01); *H04L 2209/16* (2013.01)

(58) Field of Classification Search
USPC .......................................................... 380/28
See application file for complete search history.

(56) References Cited

U.S. PATENT DOCUMENTS 7,779,272 B2 * 8/2010 Lee .......................... H04L 9/004
380/277
9,363,078 B2 * 6/2016 Taylor ................... H04L 9/0618
(Continued)

FOREIGN PATENT DOCUMENTS

WO    WO-2015091172 A1 *    6/2015    ........... H04L 9/0618

OTHER PUBLICATIONS

Chow et al, "White-Box Cryptography and an AES Implementation", Proceedings of the 9th Annual Workshop on Selected Areas in Cryptography, 2002, pp. 1-18.
(Continued)

*Primary Examiner* — Taghi T Arani

(57) ABSTRACT

A system for performing a secure sequence of transformations of a data value, using encrypted representations of the data value is disclosed. The system includes a first transformer for applying a transformation to an input data value to obtain an obfuscated representation thereof. The obfuscated representation contains a redundancy that depends on an input variable. The system further includes a sequence of second transformer for applying a transformation to compute transformed obfuscated representations. The system also includes a fourth transformer for applying a transformation such that a last obfuscated transformed data is obtained. The system further includes a fifth transformer for applying a transformation that depends on the last obfuscated transformed data and the input data.

12 Claims, 2 Drawing Sheets

(56) References Cited

U.S. PATENT DOCUMENTS

| | | | | |
|---|---|---|---|---|
| 2002/0051537 A1* | 5/2002 | Rogaway | | H04L 9/0643 380/46 |
| 2003/0072445 A1* | 4/2003 | Kuhlman | | H04L 1/0001 380/42 |
| 2003/0219120 A1* | 11/2003 | Kocarev | | H04L 9/001 380/28 |
| 2004/0165726 A1* | 8/2004 | Yamamichi | | H04L 9/085 380/277 |
| 2007/0140478 A1* | 6/2007 | Komano | | H04L 9/003 380/28 |
| 2007/0237327 A1* | 10/2007 | Taylor | | H04L 9/0662 380/37 |
| 2008/0025496 A1* | 1/2008 | Smith | | G06F 21/64 380/28 |
| 2008/0130869 A1* | 6/2008 | Akkar | | G06F 7/38 380/28 |
| 2010/0111296 A1* | 5/2010 | Brown | | H04L 9/0643 380/28 |
| 2012/0020476 A1* | 1/2012 | Billet | | H04L 9/304 380/44 |
| 2012/0027201 A1* | 2/2012 | Fujisaki | | H04L 9/3073 380/28 |
| 2012/0300922 A1* | 11/2012 | Billet | | H04L 9/0618 380/28 |
| 2015/0215113 A1* | 7/2015 | Naito | | H04L 9/0643 380/28 |
| 2015/0280906 A1* | 10/2015 | Shany | | H04L 9/004 380/29 |

OTHER PUBLICATIONS

Golic et al, "Multiplicative Masking and Power Analysis of AES", International Assosciation for Cryptologic Research, vol. 20020708:211750, 2002, pp. 1-10.

Menezes et al, "Public-Key Encryption", Handbook of Applied Cryptography, Chapter 8, 1996, pp. 283-319.

* cited by examiner

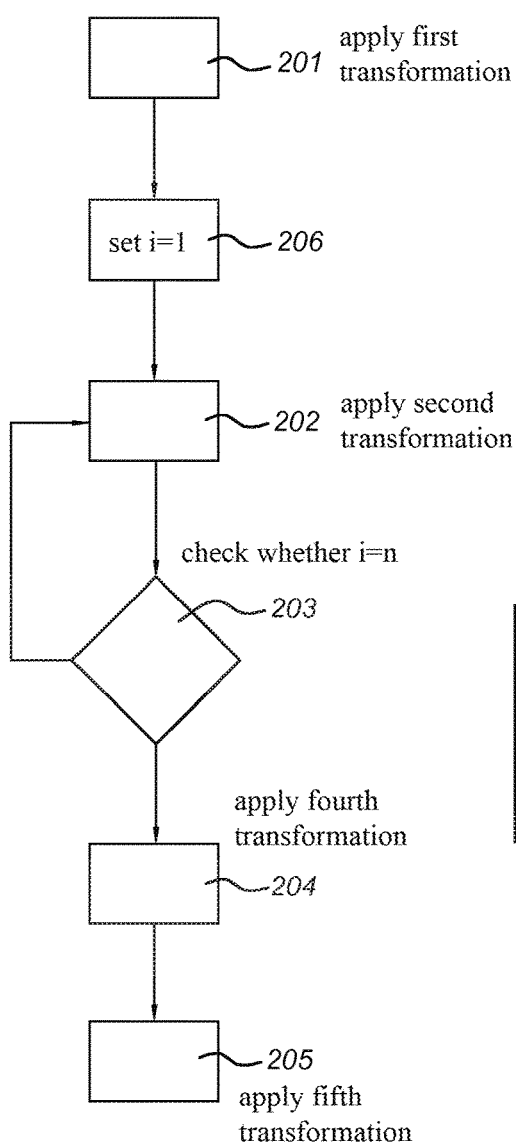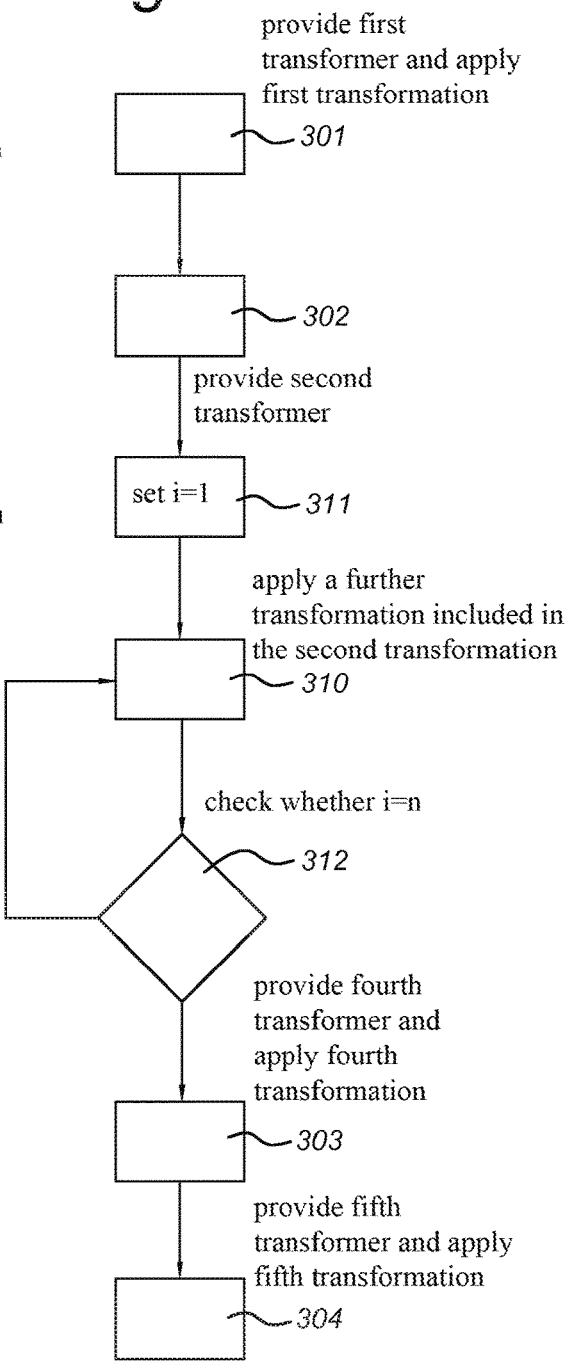

SECURE DATA TRANSFORMATIONS

CROSS-REFERENCE TO PRIOR APPLICATIONS

This application is the U.S. National Phase application under 35 U.S.C. § 371 of International Application No. PCT/EP2014/077301, filed on Dec. 11, 2014, which claims the benefit of European Patent Application No. 13198922.0, filed on Dec. 20, 2013. These applications are hereby incorporated by reference herein.

FIELD OF THE INVENTION

The invention relates to computing a transformation of data using encrypted representations of a data value.

BACKGROUND OF THE INVENTION

In recent years, developments have been made to make computer operations more secure. For example, a device may be allowed to decode certain data, but this capability should not be transferrable to other devices or users easily.

White-box cryptography is a technology in which function evaluations are performed by means of pre-computed look-up tables. This technology can be used to hide the functionality from attackers who may have access to the code of a program. The look-up tables may be designed in such a way that a sequence of table look-ups is performed using different look-up tables, to implement an algorithm. The look-up tables may further be designed in such a way that the intermediate results in between successive table look-ups is encoded by means of random bijections. White-box technology is known from for example "White-Box Cryptography and an AES Implementation", by S. Chow, P. A. Eisen, H. Johnson, and P. C. van Oorschot, in: Proceeding SAC 2002 Revised Papers from the 9th Annual International Workshop on Selected Areas in Cryptography, pages 250-270, Springer-Verlag London, UK.

US 2012/0300922 A1 discloses a method for generating a correspondence table suitable for use in a cryptographic processing method and comprising storing a plurality of input data and of output data in the table, each input datum being associated with at least one output datum in the table. For each input datum, at least one of the output data is obtained by applying a coding function to a first subsidiary datum and to an encrypted intermediate datum depending on the input datum.

SUMMARY OF THE INVENTION

It would be advantageous to have a system that allows for secure processing of data that has improved protection against attacks. In a first aspect, the invention provides a system for performing a secure sequence of n transformations $T_i$, wherein i=1, . . . , n, of a data value, using encrypted representations of the data value, comprising first transformation means for applying a transformation to an input data value $w_0$ to obtain an obfuscated representation $(X_0, Y_0)$ of $w_0$, wherein the obfuscated representation contains a redundancy that depends on an input variable r;

second transformation means for, for each of i=1, . . . , n−1, applying a transformation $\underline{u}_i$ to compute $(X_i, Y_i)$ from $(X_{i-1}, Y_{i-1})$, such that $(X_i, Y_i)=\underline{u}_i(X_{i-1}, Y_{i-1})$;

third transformation means for applying a transformation G that depends on $X_{n-1}, Y_{n-1}$, and r, by computing $w_n=G(X_{n-1}, Y_{n-1}, r)$, to obtain an outcome of the sequence of transformations, wherein $w_n = T_n \circ \ldots \circ T_1(w_0)$;

wherein $(X_i, Y_i)=\Psi_i(w_i, \sigma_i)$, for i=0,1, . . . , n, wherein $\Psi_i$ is a predefined obfuscation function that defines a one-to-one relation between $(X_i, Y_i)$ and $(w_i, \sigma_i)$, and wherein $\Psi_i$ satisfies a condition that there is a one-to-one mapping that maps any value of $(X_i, \sigma_i)$ to a value of $(w_i, Y_i)$ in such a way that $(X_i, Y_i)=\Psi_i(w_i, \sigma_i)$;

$\sigma_0$ depends on r; and wherein $w_i=T_i(w_{i-1})$ and $\sigma_i=g_i(\sigma_{i-1})$ for i=1, . . . , n for predetermined functions $T_i$ and $g_i$, wherein $w_1, \ldots, w_{n-1}$ and $\sigma_0, \ldots \sigma_n$ are not explicitly computed by the system.

Herein, an operator A is considered to be "linear with respect to the operator $\oplus$" if and only if $A(x \oplus y)=Ax \oplus Ay$.

This system has the advantage, that it is more difficult to analyze the inner workings of the system by varying input values and analyzing system behavior, for example, because a change of an intermediate variable (for example $X_i$ or $Y_i$, for some i) by an attacker may cause a change of the state $\sigma_n$. Because of this, the result of the fifth transformation means will become unpredictable, as the transformation F $(X_n, r)$ uses r to mix an expected value of $\sigma$ with the information relating to $\sigma$ that is present in $X_n$. If r and the information relating to $\sigma$ that is present in $X_n$ do not correspond to the same value of $\sigma$, the output of the fifth transformation means may be erratic, which complicates the analysis an attacker has to perform to understand the system.

The third transformation means may comprise fourth transformation means for applying a transformation $u_n$ such that $X_n=u_n(X_{n-1}, Y_{n-1})$; and fifth transformation means for applying a transformation F by computing $w_n=F(X_n, r)$, to obtain an outcome of the sequence of transformations, wherein $w_n=T_n \circ \ldots \circ T_1(w_0)$. This allows an efficient implementation. If the transformations are implemented in form of look-up tables, this feature allows the implementation of the look-up tables with reduced memory space.

In an example, $(X_i, Y_i)=(w_i, \sigma_i)$ is defined as follows for i=0,1, . . . , n:

$$X_i = \Psi_i^X(A_i(\varphi_i^1(w_i)) \oplus B_i(\varphi_i^2(\sigma_i)))$$

$$Y_i = \Psi_i^Y(C_i(\varphi_i^1(w_i)) \oplus D_i(\varphi_i^2(\sigma_i)))$$

wherein $\oplus$ is an operator, $A_i, B_i, C_i$, and $D_i$ are operators that are linear with respect to the operator $\oplus$, the operators $A_n$ and $D_n$ are invertible and an operator $\Sigma_i$ that maps (u, v) to $(A_i(u) \oplus B_i(v), C_i(u) \oplus D_i(v))$ is invertible;

$\Psi_i^X, \Psi_i^Y, \varphi_i^1$, and $\varphi_i^2$ are invertible mappings.

This example of the obfuscation function provides for a relatively easy design of the system. The operators $\Psi_i^X$ and $\Psi_i^Y$ may be used to replace or implement $\Psi_i$. In this example, an operator G is considered to be linear with respect to the operator $\oplus$ if it generally holds that $G(x \oplus y)=G(x) \oplus G(y)$.

For example, $A_i$ and $D_i$ are invertible linear operators for all i=0,1, . . . , n.

For example, r equals $w_0$. This means that the state variable $\sigma_0$ depends on $w_0$. The relation between the input data $w_0$ and the state variable $\sigma_0$ may remain unclear to the attacker by obfuscating this relation with the relation implemented by the first transformation means, for example by implementing the relation between the input data $w_0$ and the obfuscated representation $(X_0, Y_0)$ using a look-up table, in such a way that the value $\sigma_0$ is not computed as an intermediate result in the system.

For example, $g_{n-1} \circ \ldots \circ g_1$ has a computational complexity that is smaller than a computational complexity of $\underline{u}_{n-1} \circ \ldots \circ \underline{u}_1$. This allows that the transformation F has a relatively small computational complexity. For example, the computational complexity of $g_{n-1} \circ \ldots \circ g_1$ does not depend on n.

For example, $g_{n-1} \circ \ldots \circ g_1$ is an identity function. This makes it easy to design F ($X_n$, r), as the value of $\sigma_0$ is also implicitly used in its dependence on r in the first transformation means.

For example, the operator $\oplus$ is a bitwise XOR operation.

For example, at least one of the first, second, third, fourth, and fifth transformation means are configured to look up a transformed value in a look-up table. For example, each of the first, second, and third transformation means are configured to look up a transformed value in a look-up table. In another example, each of the first, second, fourth, and fifth transformation means are configured to look up a transformed value in a look-up table. These examples allow for a particularly secure implementation, as the look-up table allows to hide any used algorithm.

Another aspect comprises a method of providing a system for performing a secure sequence of n transformations wherein i=1, n, to a data value, using encrypted representations of the data value, the method comprising providing first transformation means and configuring the first transformation means to apply a transformation to an input data value $w_0$ to obtain an obfuscated representation ($X_0$, $Y_0$) of $w_0$, wherein the obfuscated representation ($X_0$, $Y_0$) contains a redundancy that depends on an input variable r;

providing second transformation means and configuring the second transformation means to, for each of i=1, . . . , n−1, apply a transformation $\underline{u}_i$ to compute ($X_i$, $Y_i$) from ($X_{i-1}$, $Y_{i-1}$), such that ($X_i$, $Y_i$)=$\underline{u}_i$($X_{i-1}$, $Y_{i-1}$);

providing fourth transformation means and configuring the fourth transformation means to apply a transformation $u_n$=$u_n$($X_{n-1}$, $Y_{n-1}$); and providing fifth transformation means and configuring the fifth transformation means to apply a transformation F such that $w_n$=F ($X_n$, r), to obtain an outcome of the sequence of transformations, wherein $w_n$=$T_n \circ \ldots \circ T_1(w_0)$;

wherein ($X_i$,$Y_i$)=$\Psi_i$($w_i$, $\sigma_i$), for i=0,1, . . . , n, wherein $\Psi_i$ is a predefined obfuscation function that defines a one-to-one relation between ($X_i$,$Y_i$) and ($w_i$, $\sigma_i$), and wherein $\Psi_i$ satisfies a condition that there is a one-to-one mapping that maps any value of ($X_i$, $\sigma_i$) to a value of ($w_i$, $Y_i$) in such a way that ($X_i$, $Y_i$)=$\Psi_i$($w_i$, $\sigma_i$);

$\sigma_0$ depends on r;

wherein $w_i$=$T_i(w_{i-1})$ and $\sigma_i$=$g_i(\sigma_{i-1})$ for i=1, . . . , n for predetermined functions $T_i$ and $g_i$;

wherein the first transformation means, the second transformation means, the fourth transformation means, and the fifth transformation means are configured to obfuscate the values of $w_1$, . . . , $w_{n-1}$ and $\sigma_0$, . . . $\sigma_n$.

This method allows to generate the system.

The step of configuring the second transformation means may comprise computing at least one look-up table of at least one of the functions $\underline{u}_i$, wherein the look-up table maps values of ($X_{i-1}$, $Y_{i-1}$) to values of ($X_i$, $Y_i$), by computing ($X_i$, $Y_i$)=$\underline{u}_i$ ($X_{i-1}$, $Y_{i-1}$)=$\Psi_i$ ($T_i(\Psi_{i-1}^{inverse}$ ($X_{i-1}$, $Y_{i-1}$)) $g_i$ ($\Psi_{i-1}^{inverse}$($X_{i-1}$, $Y_{i-1}$))), wherein $\Psi_{i-1}^{inverse}$ is an inverse of $\Psi_{i-1}$. This way, the algorithmic steps involved in computing $\underline{u}_i$ may be hidden in one or more look-up tables. The use of look-up tables allows for further obfuscation techniques, including above-mentioned white-box implementations.

Alternatively, the step of configuring the second transformation means may comprise computing at least one look-up table of at least one of the functions $\underline{u}_i$, wherein the look-up table maps values of ($X_{i-1}$, $Y_{i-1}$) to values of ($X_i$, $Y_i$), by computing ($X_i$, $Y_i$)=$\underline{u}_i$($X_{i-1}$, $Y_{i-1}$)=$f(T_i(f_i^{inverse}$($X_{i-1}$, $Y_{i-1}$))), wherein $f_i$ denotes a function defined by $f_i(w_i, \sigma_i)$=($\Psi_i^X(A_i(\varphi_i^1(w_i)) \oplus B_i(\varphi_i^2(\sigma_i)))$, $\Psi_i^Y(C_i(\varphi_i^1(w_i)) \oplus D_i(\varphi_i^2(\sigma_i))))$, and $f_i^{inverse}$ is an inverse of $f_i$. This way, the algorithmic steps of involved in computing $f_i$, $f_i^{inverse}$, and $T_i$ may be hidden in one or more look-up tables. The use of look-up tables allows for further obfuscation techniques, including above-mentioned white-box implementations.

For example, r equals $w_0$, and the step of configuring the third transformation means comprises computing at least one look-up table representing the function G, wherein the at least one look-up table maps tuples of $G(X_{i-1}, Y_{i-1}, w_0)$ to corresponding values of $w_n$=$G(X_{i-1}, Y_{i-1}, w_0)$. In a related example, the step of configuring the fifth transformation means comprises computing at least one look-up table representing the function F, wherein the at least one look-up table maps pairs of ($X_n$, $w_0$) to corresponding values of $w_n$=$F(X_n, w_0)$. In these examples, the algorithmic steps of involved in computing G or F or may be hidden in one or more look-up tables. The use of look-up tables allows for further obfuscation techniques, including above-mentioned white-box implementations.

According to another aspect, a method is provided for performing a secure sequence of n transformations $T_i$, wherein i=1, . . . , n, to a data value, using encrypted representations of the data value, the method comprising applying a transformation to an input data value $w_0$, to obtain an obfuscated representation ($X_0$, $Y_0$) of $w_0$, wherein the obfuscated representation contains a redundancy that depends on an input variable r;

for each of i=1, . . . , n−1, applying a transformation $\underline{u}_i$ to compute ($X_i$,$Y_i$) from ($X_{i-1}$, $Y_{i-1}$), such that ($X_i$, $Y_i$)=$\underline{u}_i$ ($X_{i-1}$, $Y_{i-1}$);

applying a transformation G that depends on $X_{n-1}$, $Y_{n-1}$, and r, by computing $w_n$=$G(X_{i-1}, Y_{i-1}, r)$, to obtain an outcome of the sequence of transformations, wherein $w_n$=$T_n \circ \ldots \circ T_1(w_0)$;

wherein ($X_i$, $Y_i$)=$\Psi_i$($w_i$, $\sigma_i$), for i=0,1, . . . , n, wherein $\Psi_i$ is a predefined obfuscation function that defines a one-to-one relation between ($X_i$, $Y_i$) and ($w_i$, $\sigma_i$), and wherein $\Psi_i$ satisfies a condition that there is a one-to-one mapping that maps any value of ($X_i$, $\sigma_i$) to a value of ($w_i$, $Y_i$) in such a way that ($X_i$, $Y_i$)=$\Psi_i$($w_i$, $\sigma_i$);

$\sigma_0$ depends on r;

wherein $w_i$=$T_i(w_{i-1})$ and $\sigma_i$=$g_i(\sigma_{i-1})$ for i=1, . . . , n for predetermined functions $T_i$ and $g_i$, wherein $w_1$, . . . , $w_{n-1}$ and $\sigma_0$, . . . $\sigma_n$ are obfuscated in the steps of applying a transformation.

In a particular example, the step of applying the transformation G comprises applying a transformation $u_n$ such that $X_n$=$u_n(X_{n-1}, Y_{n-1})$; and applying a transformation F such that $w_n$=F ($X_n$, r), to obtain an outcome of the sequence of transformations, wherein $w_n$=$T_n \circ \ldots \circ T_1(w_0)$.

According to another aspect, a computer program product is provided comprising instructions for causing a processor system to perform the method set forth herein.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the drawings, similar items are indicated with the same reference numerals.

FIG. 2 is a diagram illustrating a method including a sequence of secure data transformations.

FIG. 3 is a diagram illustrating a method of providing a system as shown in FIG. 1.

DETAILED DESCRIPTION OF EMBODIMENTS

Figure 1:
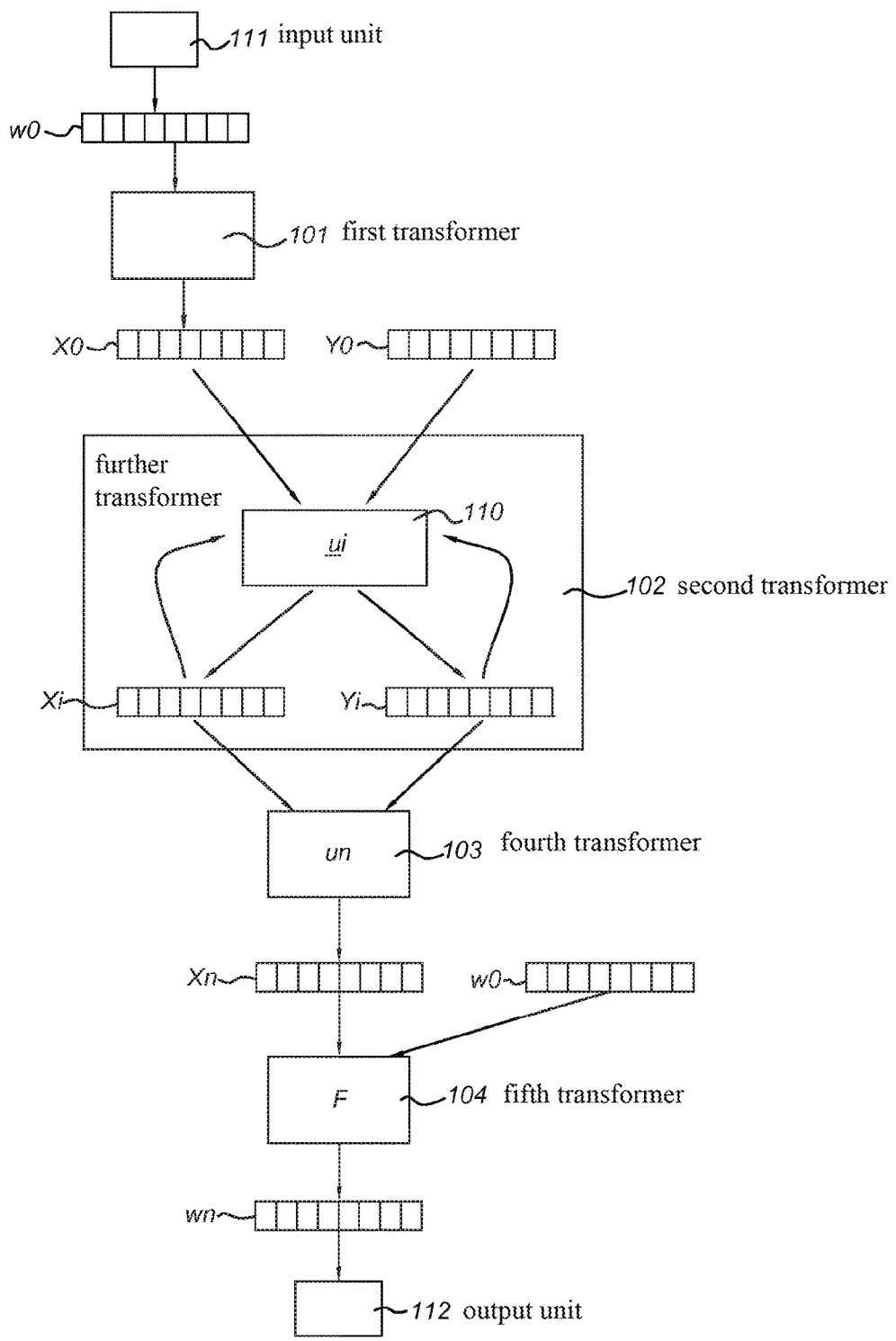
FIG. 1 is a block diagram of a system for securely performing a sequence of transformations.

In many applications, it is necessary to apply a transformation T on an input data $w_0$. For complexity reasons or other reasons, is may be desirable that T be computed by successively applying transformations $T_1, \ldots, T_n$. That is, for $1 \le i \le n$, the following computational step is performed:

$$w_i = T_i(w_{i-1}).$$

The transformations $T_1, \ldots, T_n$ are selected in such a way that the result of this iteration, $w_n$, is equal to $T(w_0)$. However, it would be desirable to hide the algorithms used in the transformations, and/or it would be desirable that the intermediate values, $w_1, \ldots, w_{n-1}$, be hidden from a malicious user, even if the malicious user has full access to the device, including access to the working memory, or even if the malicious user has capability to use debugging tools to analyze the application.

Therefore, instead of computing the values of $w_1, \ldots, w_{n-1}$ explicitly, alternate values $z_1, \ldots, z_{n-1}$ are computed in which the values of $w_1, \ldots, w_{n-1}$, respectively, are hidden. The values $z_1, \ldots, z_{n-1}$ contain more information bits than the values $w_1, \ldots, w_{n-1}$, because the value of a redundant state variable $\sigma_i$ is also represented by the values $z_1, \ldots, z_{n-1}$. In a preferred example, the value of $w_n$ is computed from $z_7$ and $w_0$.

Some notation is introduced which will be used in the explanations hereinafter. For $0 \le i \le n$, the set of potential values of $w_i$ is denoted by $W_i$. For $0 \le i \le n$, a non-empty "state set" $\Sigma_i$ contains the possible values of state variable $\sigma_i$. To avoid trivialities, it is assumed that $\Sigma_0$ has at least two elements; preferably, each $\Sigma_i$ has at least two elements, and even more preferably, each $\Sigma_i$ has more than two elements. For $0 \le i \le n-1$, a secret "next-state" function $g_i: \Sigma_i \to \Sigma_{i+1}$ is chosen to define $\sigma_{i+1} = g_i(\sigma_i)$. Moreover, a secret "state-introduction" function $s: W_i \to \Sigma_0$ is chosen, so that $\sigma_0 = s(w_0)$. Finally, for $0 \le i \le n$, a set $Z_i$ of cardinality $|W_i| \cdot |\Sigma_i|$, and a secret one-to-one mapping $f_i: W_i \times \Sigma_i \to Z_i$ are chosen. For example, $Z_i = W_i \times \Sigma_i$. The mapping $f_i$ describes the relation between values $z_i$ that are computed by the secure computing device and the corresponding values of $(w_i, \sigma_i)$, wherein $w_i$ is the processed data and $\sigma_i$ is a redundant state variable that helps obfuscate $w_i$ in its representation $z_i$.

Let $1 \le i \le n$. By definition, $z_i = f_i(w_i, \sigma_i) = f_i(T_i(w_{i-1}), g_i(\sigma_{i-1}))$. As $f_{i-1}$ is invertible, it is possible to compute $w_{i-1}$ and $\sigma_{i-1}$ as $(w_{i-1}, \sigma_{i-1}) = f_{i-1}^{inverse}(z_{i-1})$. Consequently, it is possible to compute $z_i$ from $z_{i-1}$ by first computing $(w_{i-1},$ $\sigma_{i-1}) = f_{i-1}^{inverse}(z_{i-1})$ and then $z_i = f_i(w_i, \sigma_i) = f_i(T_i(w_{i-1}), g_i(\sigma_{i-1}))$. This computation could be performed without computing the intermediate values of $(w_{i-1}, \sigma_{i-1})$ or $(w_i, \sigma_i)$, for example by tabulating values of $z_i$ and corresponding $z_{i-1}$, or another obfuscated computation of a function $u_i$ that computes $z_i$ from $z_{i-1}$, so that $z_i$ and corresponding $z_{i-1}$, $(X_i, Y_i)$ from $(X_{i-1}, Y_{i-1})$, such that $z_i = u_i(z_{i-1})$.

Note that $z_i$ may be divided into two components, so that $z_i = (X_i, Y_i)$, for $1 \le i \le n$. That is, the information of each of $w_i$ and $\sigma_i$ may be distributed over both components $X_i$ and $Y_i$. In a specific example, $Z_i = W_i \times \Sigma_i$ and thus $X_i \in W_i$ and $Y_i \in \Sigma_i$. Alternatively, $X_i$ is selected from a set of cardinality $|W_i|$ and $Y_i$ is selected from a set of cardinality $|\Sigma_i|$.

The computation may be started by computing $z_0 = (X_0, Y_0)$ from $w_0$ using $(X_0, Y_0) = f_0(w_0, s(w_0))$. Herein, $s(w_0)$ denotes a function that computes a state value $\sigma_0$ from the input value $w_0$. The function $s(w_0)$ and $f_0$ may be combined, for example in a look-up table, to hide the value of $\sigma_0$ from an attacker. Alternatively, the value of $\sigma_0$ may depend on another input data element r instead of $w_0$.

Because of the way in which the pairs $z_i = (X_i, Y_i)$ are computed by the electronic device (described above), it follows that these values $z_i = (X_i, Y_i)$ depend on the input value $w_0$ and optionally on the extra input element r. Similarly, the values of $\sigma_i$ (although not computed by the electronic device) depend on $w_0$ and/or optionally on the extra input element r.

If the electronic device computes $z_n = (X_n, Y_n)$ in the way described above, it can compute $w_n = f_n^{inverse}(z_n)$. However, with a proper constraint in place, it is also possible to compute $w_n$ from $X_n$ and $w_0$ (and/or r, if $\sigma_0$ depends on r). This constraint is as follows: For any two values $w \in W_n$ and $w' \in W_n$ with $w \ne w'$, and any $\sigma \in \Sigma_n$, wherein $(X, Y) = f_n(w, \sigma)$ and $(X', Y') = f_n(w', \sigma)$, it should hold that $X \ne X'$. If this property holds, then it is possible to construct a transformation, for example a look-up table, which maps pairs of $X_n$ and $w_0$ (or pairs of $X_n$ and r) to the corresponding values of $w_n$. In such a case it is not necessary to compute $Y_n$. This may make it more difficult to extract information from the electronic device by varying the values of $X_i$ and/or $Y_i$.

In this description, $f_i$ may also be denoted by $\Psi_i$. These symbols have the same meaning in this description. Accordingly, $(X_i, Y_i) = \Psi_i(w_i, \sigma_i)$, for $i = 0, 1, \ldots, n$. Herein, $\Psi_i$ is a predefined obfuscation function that defines a one-to-one relation between $(X_i, Y_i)$ and $(w_i, \sigma_i)$. In order to be able to determine $w_n$ on the basis of $X_n$ and $\sigma_n$, without needing the value of $Y_n$, the function $\Psi_n$ may be selected such that $\Psi_n$ satisfies a condition that there is a one-to-one mapping that maps any value of $(X_n, \sigma_n)$ to a value of $(w_n, Y_n)$ in such a way that $(X_n, Y_n) = \Psi_n(w_n, \sigma_n)$. Such a function may be designed by trial and error. A class of functions for which the condition holds is given in the following example.

Hereinafter, a particular example will be described, in which more detailed examples are given for several components of the algorithm. In this example, there are positive integers p and q such that for all i, $W_i = \{0,1\}^p$ and $\Sigma_i = \{0,1\}^q$. Moreover, $Z_i = W_i \times \Sigma_i = \{0,1\}^p \times \{0,1\}^q$. It is noted that this is equivalent to setting $Z_i = \{0,1\}^{p+q}$.

In an even more detailed example, in addition to the sets selected in the previous example, the functions $f_i$ are selected such that $f_i(w_i, \sigma_i) = (X_i, Y_i)$, wherein $$X_i = \Psi_i^X(A_i(\varphi_i^1(w_i)) \oplus B_i(\varphi_i^2(\sigma_i)))$$

Herein, $\oplus$ indicates the bit-wise modulo operation. $A_i$ is an invertible linear mapping from $\{0,1\}^p$ onto $\{0,1\}^p$. $D_i$ is an invertible linear mapping from $\{0,1\}^q$ onto $\{0,1\}^q$. $B_i$ is a linear mapping from $\{0,1\}^q$ onto $\{0,1\}^p$. $C_i$ is a linear mapping from $\{0,1\}^p$ onto $\{0,1\}^q$. The superscripts of functions denote indices. The linear mapping $E_i$ that maps $(u, v)$ to $(A_i(u) \oplus B_i(v), C_i(u) \oplus D_i(v))$ is invertible. $\varphi_i^1$ and $\Psi_i^X$ are invertible mappings on $\{0,1\}^p$ which may be non-linear. $\varphi_i^2$ and $\Psi_i^Y$ are invertible mappings on $\{0,1\}^q$ which may be non-linear. In case $p \neq q$, it is preferred that $B_i$ and $C_i$ are also invertible. In case $p \neq q$, it is preferred that the matrices corresponding to the linear mappings $B_i$ and $C_i$ have full rank.

In principle it is possible to compute the value of $w_n$ from $z_n = (X_n, Y_n)$ using the above equations. However, in a preferred example, the device does not compute $Y_n$, but only computes $X_n$. In that case the device is configured to compute $w_n$ from $X_n$ and $w_0$ (or r, as the case may be).

It is noted that $$X_n = \Psi_n^X(A_n(\varphi_n^1(w_n)) \oplus B_n(\varphi_n^2(\sigma_n))).$$

As $\Psi_n^X$ is invertible, it is possible to compute the value of $A_n(\varphi_n^1(w_n)) \oplus B_n(\varphi_n^2(\sigma_n))$ from given $X_n$. Moreover, as $\sigma_n$ may be obtained from $w_0$ (or r, as the case may be), it is possible to compute $B_n(\varphi_n^2(\sigma_n))$ from $w_0$ (or r, as the case may be). From this information, $w_n$ can be determined. Preferably, $w_n$ is directly obtained from $X_n$ and $w_0$ without revealing any of the intermediate results mentioned in this paragraph. For example, the relationship may be stored in a table or multiple tables. Multiple tables may be used, for example, if one or more bits of $w_n$ do not depend on all bits of $w_0$ and/or all bits of $X_n$.

For example, $g_{n-1} \circ \ldots \circ g_1$ has a computational complexity that is substantially smaller than a computational complexity of $\underline{u}_{n-1} \circ \ldots \circ \underline{u}_1$. This allows that $w_n$ can be computed from $X_n$ and r with a relatively small computational complexity. For example, the computational complexity of $g_{n-1} \circ \ldots \circ g_1$ does not depend on n.

For example, $g_{n-1} \circ \ldots \circ g_1$ is an identity function. This makes it easy to design $F(X_n, r)$, as the value of $\sigma$ is also implicitly used in its dependence on r in the first transformation means.

FIG. 1 illustrates an embodiment of a system for performing a secure sequence of transformations. In the illustrations, several processing means have been denoted by rectangles, sometimes with a corresponding symbol used in this description inside the rectangle. Moreover, data elements have been indicated by their variable symbol and a sketched array symbolizing a bit sequence of a given length. However, the actual length of the bit sequence of each data element may be varied. The drawings do not indicate the actual length of the data elements. The system may be implemented on a single processing device, such as a properly programmed computer, a smartphone, or a smartcard. The system may also be distributed over several different processing devices.

The system comprises a data input unit 111 for determining an input data value $w_0$. For example, the input unit 111 is configured to receive the input data value via a communications subsystem of the device. Alternatively, the input unit 111 may be configured to receive the input data value from a memory, which may be an internal memory or an external memory. The system further comprises a first transformation means 101 for applying a transformation to the input data value $w_0$ to obtain the obfuscated representation $(X_0, Y_0)$ of $w_0$ such that $(X_0, Y_0) = f_0(w_0, s(w_0))$. In a specific example, $w_0$, $\sigma_0 = s(w_0)$, $X_0$, and $Y_0$ all are data values having the same number of bits.

The system further comprises a second transformation means 102. The second transformation means 102 comprises one or more further transformation means 110. A further transformation means 110 implements $\underline{u}_i$ for a particular value of i, wherein $i = 1, \ldots, n-1$. The second transformation means 102 is configured to apply the further transformation means 110 to the obfuscated data in one or more iterations. More specifically, the further transformation means 110 computes $(X_i, Y_i) = \underline{u}_i(X_{i-1}, Y_{i-1})$, for $i = 1, \ldots, n-1$, wherein n is the number of transformations to be performed. It will be understood that the further transformation means 110 may compute a different operation in each iteration; that is, $\underline{u}_i$ may be a different operation for each $i = 1, \ldots, n-1$. However, this is not a limitation as some or all of the $\underline{u}_i$ could be identical operations.

The system further comprises a third transformation means configured to apply a transformation G that depends on $X_{n-1}, Y_{n-1}$, and r, by computing $w_n = G(X_{n-1}, Y_{n-1}, r)$, to obtain an outcome of the sequence of transformations, wherein $w_n = T_n \circ \ldots \circ T_1(w_0)$. Herein, G is defined as $G(X_{n-1}, Y_{n-1}, r) = F(u_n(X_{n-1}, Y_{n-1}), r)$. In the example embodiment illustrated in FIG. 1, the third transformation means is implemented as a combination of a fourth transformation means 103 and a fifth transformation means 104.

The fourth transformation means 103 is configured to compute $X_n$ using the transformation $u_n$, so that $X_n = u_n(X_{n-1}, Y_{n-1})$. The computation of $Y_n$ may thus be omitted.

The fifth transformation means 104 is configured to receive the value $X_n$ from the fourth transformation means 103 and the value $w_0$ to compute $w_n$ using a function F such that $w_n = F(X_n, w_0)$. For example, the fifth transformation means 104 receives the value $w_0$ from the data input unit 111.

The system further comprises an output unit 112 configured to receive the computed value of $w_n$ from the fifth transformation means 104 and forward the value of $w_n$ to other components of the system (not shown), and/or store the value of $w_n$ in a memory. For example, the output unit 112 may be configured to display a visualization of the data $w_n$ on a display device and/or reproduce the data on an audio device.

In a specific example, the second transformation means 102, one or more of the further transformation means 110, and/or the fourth transformation means may receive further operand value(s), for example from an external source or from another computational unit of the system. In such a case, for example the function $u_i$ has the form $(X_i, Y_i) = \underline{u}_i(X_{i-1}, Y_{i-1}; X', Y')$, wherein $(X', Y')$ denotes an obfuscated representation of another data element $w'$ with state parameter $\sigma'$. This obfuscated representation may have a similar form as the ones described herein. Alternatively, the further operand value(s) may be provided in the clear, that is, $u_i$ may have the form $(X_i, Y_i) = \underline{u}_i(X_{i-1}, Y_{i-1}; w')$, wherein $w'$ denotes a further data element that is not obfuscated.

In a specific variation of the system shown in FIG. 1, the first transformation means 101 may be configured to receive a further parameter r (not shown in the drawing), and the redundancy in the obfuscated representation $(X_0, Y_0)$ of $w_0$ may depend on an input variable r, as explained above. In such a case, the same further parameter r is provided also to the third transformation unit and/or the fifth transformation unit 104, so that for example the fifth transformation unit 104 can compute the value of $w_n$ in dependence on both $X_n$ and r.

It is noted that the first transformation means 101, the second transformation means 102, the third transformation means, the fourth transformation means 103, and/or the fifth transformation means 104 may be implemented by means of look-up tables. For example, the first transformation means 101, the further transformation means 110 of the second transformation means 102, the fourth transformation means 103, and the fifth transformation means 104 may each be implemented by a single look-up table. Alternatively, it is possible to use a plurality of look-up tables that are designed to be applied cooperatively by one of the transformation means, to implement one of the transformations together.

Optionally, these look-up tables may be obfuscated further by encoding the inputs and outputs of the look-up tables using techniques known from e.g. Chow et al. The look-up tables are an example of how the transformations can be performed without revealing intermediate results which should remain hidden, such as values of $\sigma_i$, for $i=0, \ldots, n$, and in particular $\sigma_0$ which plays a role in the first and fifth transformation means (or more generally, in the first and third transformation means).

FIG. 2 illustrates a method of performing a secure sequence of n transformations $T_i$, wherein $i=1, \ldots, n$, to a data value, using encrypted representations of the data value. The method comprises a step 201 of applying a transformation to an input data value $w_0$ to obtain an obfuscated representation $(X_0, Y_0)$ of $w_0$, wherein the obfuscated representation $(X_0, Y_0)$ contains a redundancy that depends on an input variable r.

Next, in step 206, an index value i is initialized by setting $i=1$.

Next, the method proceeds with step 202 of applying a transformation $\underline{u}_i$ to compute $(X_i, Y_i)$ from $(X_{i-1}, Y_{i-1})$, such that $(X_i, Y_i) = \underline{u}_i(X_{i-1}, Y_{i-1})$. After applying the transformation, i is increased by one.

Next, the method proceeds with step 203 of verifying whether the iteration is complete, by checking whether $i=n$. If $i \neq n$, the method repeats step 202 with the updated value of i.

If $i=n$ at step 203, the method proceeds with step 204 of applying a transformation $u_n$ such that $X_n = u_n(X_{n-1}, Y_{n-1})$. Next, the method proceeds with step 205 of applying a transformation F such that $w_n = F(X_n, r)$, to obtain an outcome of the sequence of transformations, wherein $w_n = T_n \circ \ldots \circ T_1(w_0)$. It is noted that step 204 and step 205 may be combined in a single step.

In the above method, the symbols are as explained above in this description for several examples.

For example, for $i=0, 1, \ldots, n$ $$X_i = \Psi_i^X(A_i(\varphi_i^1(w_i)) \oplus B_i(\varphi_i^2(\sigma_i)))$$

$$Y_i = \Psi_i^Y(C_i(\varphi_i^1(w_i)) \oplus D_i(\varphi_i^2(\sigma_i)))$$

wherein
⊕ is an operator,
$A_i$, $B_i$, $C_i$, and $D_i$ are operators that are linear with respect to the operator ⊕, the operators $A_i$ and $D_i$ are invertible and the operator $E_i$ that maps $(u, v)$ to $(A_i(u) \oplus B_i(v), C_i(u) \oplus D_i(v))$ is invertible;
$\Psi_i^X$, $\Psi_i^Y$, $\varphi_i^1$, and $\varphi_i^2$ are invertible mappings;
$\sigma_0$ depends on r;
wherein $w_i = T_i(w_{i-1})$ and $\sigma_i = g_i(\sigma_{i-1})$ for $i=1, \ldots, n$ for predetermined functions $T_i$ and $g_i$, wherein $w_1, \ldots, w_{n-1}$ and $\sigma_0, \ldots \sigma_n$ are not explicitly computed by the system.

FIG. 3 illustrates a method of providing a system for performing a secure sequence of n transformations $T_n$, wherein $i=1, \ldots, n$, to a data value, using encrypted representations of the data value.

The method commences with step 301 of providing first transformation means 101 and configuring the first transformation means 201 to apply a transformation to an input data value $w_0$ to obtain an obfuscated representation $(X_0, Y_0)$ of $w_0$, wherein the obfuscated representation $(X_0, Y_0)$ contains a redundancy that depends on an input variable r.

The method proceeds in step 302 with providing the second transformation means 102. In step 311, an index value i is initialized by setting $i=1$. Next, in step 310, a further transformation means 110 is included into the second transformation means 102. This further transformation means 110 is configured to apply a transformation $u_i$ to compute $(X_i, Y_i)$ from $(X_{i-1}, Y_{i-1})$, such that $(X_i, Y_i) = \underline{u}_i(X_{i-1}, Y_{i-1})$. Thereafter, the index value i is incremented. In step 312, it is checked whether $i=n$. If $i \neq n$ in step 312, the method repeats step 310 with the updated value of i.

If $i=n$ at step 312, the method proceeds with step 303 of providing fourth transformation means 103 and configuring the fourth transformation means 103 to apply a transformation $u_n$ such that $X_n = u_n(X_{n-1}, Y_{n-1})$.

Next, in step 304, the method proceeds with providing fifth transformation means 104 and configuring the fifth transformation means 104 to apply a transformation F such that $w_n = F(X_n, r)$, to obtain an outcome of the sequence of transformations, wherein $w_n = T_n \circ \ldots \circ T_1(w_0)$.

It is noted that steps 303 and 304 may be combined such that a third transformation means is provided that applies the transformation G, as explained above.

The method steps are performed in such a way that the first transformation means, the second transformation means, the fourth transformation means, and the fifth transformation means are configured to obfuscate the values of $w_1, \ldots, w_{n-1}$ and $\sigma_0, \ldots \sigma_n$. In particular, the first transformation means 101 and the fifth transformation means 104 are configured such that they obfuscate the value of $\sigma_0$, which depends on r (or on $w_0$, as explained hereinabove), for example by creating a shortcut in the computation that directly generates the end result $w_n$ based on $X_n$ and r (or based on $X_n$ and $w_0$).

A particular example of such obfuscation is given by providing look-up tables for the most vulnerable transformations. For example, step 302 of configuring the second transformation means may comprise computing at least one look-up table of at least one of the functions $\underline{u}_i$, wherein the look-up table maps values of $(X_{i-1}, Y_{i-1})$ to values of $(X_i, Y_i)$. This look-up table may be computed by computing, for appropriate values of $(X_{i-1}, Y_{i-1})$:

$$(X_i, Y_i) = \underline{u}_i(X_{i-1}, Y_{i-1}) = f_i(T_i(f_{i-1}^{inverse}(X_{i-1}, Y_{i-1})), g_i(f_{i-1}^{inverse}(X_{i-1}, Y_{i-1}))),$$

wherein $f_i$ denotes a function defined by $$f_i(w_i, \sigma_i) = (\Psi_i^X(A_i(\varphi_i^1(w_i)) \oplus B_i(\varphi_i^2(\sigma_i))), \Psi_i^Y(C_i(\varphi_i^1(w_i)) \oplus D_i(\varphi_i^2(\sigma_i)))),$$

and $f_i^{inverse}$ is an inverse of $f_i$. In the above equations, $T_i$ uses only the component $w_i$ of $f_{i-1}^{inverse}$ is $g_i$ uses only the component $\sigma_i$ of $f_i^{inverse}$.

The fourth transformation may contain a look-up table similar to the above, with $$X_n = u_n(X_{n-1}, Y_{n-1}) = \Psi_n^X(A_n(\varphi_n^1(T_n(f_{n-1}^{inverse}(X_{n-1}, Y_{n-1})))) \oplus B_n(\varphi_n^2(g_n(f_{n-1}^{inverse}(X_{n-1}, Y_{n-1}))))),$$

wherein $T_n$ uses only the component $w_{n-1}$ of $f_{n-1}^{inverse}$ the output values of $Y_n$ are omitted.

In another example, in the specific example in which $r=w_0$, step 301 of configuring the first transformation may comprise providing a look-up table of the function that maps values of $w_0$ to corresponding values of $(X_0, Y_0)$. This relation may be given by $(X_0, Y_0) = \Psi_{(w0}, s(w_0))$, as described above, wherein $s(w_0)$ is a secret mapping that maps the value of $w_0$ to $\sigma_0$. By providing tabulated values of $w_0$ and corresponding values of $(X_0, Y_0)$, the system may apply the transformation without computing a value of $\sigma_0$. According to the more specific example that is described above, the relation implemented by the look-up table of the first transformation means may be given by $$X_0 = \Psi_0^X(A_0(\varphi_0^1(w_0)) \oplus B_0(\varphi_0^2(s(w_0)))),$$

$$Y_0 = \Psi_0^Y(C_0(\varphi_0^1(w_0)) \oplus D_0(\varphi_0^2(s(w_0)))),$$

In another example, in which $r=w_0$, step 304 of configuring the fifth transformation may comprise providing a look-up table of the function F. This table may map pairs of $(X_n, w_0)$ to corresponding values of $w_n = F(X_n, w_0)$.

Similar tables may be prepared for the case where r is a different input value separate of $w_0$.

A system for performing a secure sequence of transformations of a data value, using encrypted representations of the data value may be provided. The system comprises first transformation means for applying a transformation to an input data value to obtain an obfuscated representation thereof, wherein the obfuscated representation contains a redundancy that depends on an input variable. The system comprises a sequence of second transformation means for applying a transformation to compute transformed obfuscated representations. The system further comprises fourth transformation means for applying a transformation such that a last obfuscated transformed data is obtained. The system comprises fifth transformation means for applying a transformation that depends on the last obfuscated transformed data and the input data.

Some or all aspects of the invention may be suitable for being implemented in form of software, in particular a computer program product. Such computer program product may comprise a storage media on which the software is stored. Such a storage media may comprise, for example, an optical disc, magnetic disk, or flash memory. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be directly executable by one or more processors. Alternatively, the code may be interpreted by an interpreter that is executed by one or more processors. It will be understood that portions of the systems described herein may be implemented in form of software. Moreover, the method steps described herein may be implemented partially or completely in software. The software may be organized by means of subroutines. The subroutines may be combined to form a standalone executable program. Alternatively, the subroutines may be organized as a dynamically linkable library. A main program executable file may be provided that uses the subroutines from the dynamically linkable library. Each of the processing steps and/or system components described herein may be represented by executable code, be it in a dynamically linked library or in an executable file. Some, or all, of the functionality may be implemented as part of an operating system, some functionality may be implemented in a dynamically linked library, and some functionality may be implemented as an application program file.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A system for secure processing of data by performing a secure sequence of n transformations $T_i$, wherein $i = 1, \ldots, n$, of a data value w0, using encrypted representations of the data value to obtain a secure outcome, the system comprising a memory communicatively coupled to a processor and a non-transitory computer readable medium including instructions for causing the processor to:

perform a first transformation that applies the first transformation to the data value w0 to obtain an obfuscated representation (X0, Y0) of w0, wherein the obfuscated representation (X0, Y0) contains a redundancy that depends on an input variable r;

perform a second transformation that, for each of $i = 1, \ldots, n-1$, applies the second transformation $u_i$ to compute $(X_i, Y_i)$ from $(X(i-1), Y(i-1))$, such that $(X_i, Y_i) = u_i((X(i-1), Y(i-1)))$;

perform a third transformation G that depends on $X(n-1)$, $Y(n-1)$, and r, by computing $w_n = G(X(n-1), Y(n-1), r)$, to obtain the secure outcome, wherein $w_n = T_n \circ \ldots \circ T_1(w_0)$, the third transformation being performed by applying a fourth transformation $u_n$ such that $X_n = u_n(X(n-1), Y(n-1))$, and a fifth transformation F that depends on $X_n$ and r, by computing $w_n = F(X_n, r)$, to obtain the value of $w_n$; and cause output of the secure outcome, wherein $(X_i, Y_i) = \Psi_i(w_i, \sigma_i)$, for $i = 0, 1, \ldots, n$, wherein $\Psi_i$ is a predefined obfuscation function that defines a one-to-one relation between $(X_i, Y_i)$ and $(w_i, \sigma_i)$, $w_i$ being processed data and $\sigma_i$ being redundant state variable for obfuscating $w_i$, and wherein $\Psi_i$ satisfies a condition that there is a one-to-one mapping that maps any value of $(X_i, \sigma_i)$ to a value of $(w_i, Y_i)$ in such a way that $(X_i, Y_i) = \Psi_i(w_i, \sigma_i)$ such that a change of $X_i$ or $Y_i$ causes a change of the redundant state variable $\sigma_i$ and makes unpredictable the secure outcome, wherein $\sigma_0$ depends on r, wherein $w_i = T_i(w_{(i-1)})$ and $\sigma_i = g_i(\sigma_{(i-1)})$ for $i = 1, \ldots, n$, for predetermined functions $T_i$ and $g_i$, and wherein the first transformation, the second transformation, and the third transformation obfuscate the values of $w_1, \ldots, w_{(n-1)}$ and $\sigma_0, \ldots \sigma_n$.

2. The system according to claim 1, wherein $(X_i, Y_i) = \Psi_i(w_i, \sigma_i)$ is defined as follows for $i = 0, 1, \ldots, n$:

$$X_i = \Psi_i^X(A_i(\varphi_i^1(w_i)) \oplus B_i(\varphi_i^2(\sigma_i)))$$

$$Y_i = \Psi_i^Y(C_i(\varphi_i^1(w_i)) \oplus D_i(\varphi_i^2(\sigma_i)))$$

Wherein $\oplus$ is an operator, $A_i$, $B_i$, $C_i$, and $D_i$ are operators that are linear with respect to the operator $\oplus$, the operators $A_n$ and $D_n$ are invertible, and an operator $E_i$ that maps $(u, v)$ to $(A_i(u) \oplus B_i(v), C_i(u) \oplus D_i(v))$ is invertible; and $\Psi_i^X, \Psi_i^Y, \varphi_i^1$, and $\varphi_i^2$ are invertible mappings.

3. The system of claim 2, wherein the operator $\oplus$ is a bitwise XOR operation.

4. The system of claim 1, wherein r equals $w_0$.

5. The system of claim 1, wherein $g_{(n-1)} \circ \ldots \circ g_1$ is an identity function.

6. The system of claim 1, wherein at least one of the first, second, and third transformations are implemented by at least one pre-computed look-up table.

7. A method of providing a system for secure processing of data by performing a secure sequence of n transformations $T_i$, wherein i=1, . . . ,n, to a data value, using encrypted representations of the data value to obtain a secure outcome, the method comprising acts of:

providing a processor;

configuring the processor to apply a first transformation to the data value $w_0$ to obtain an obfuscated representation $(X_0, Y_0)$ of $w_0$, wherein the obfuscated representation $(X_0, Y_0)$ contains a redundancy that depends on an input variable r;

configuring the processor to, for each of i=1, . . . ,n−1, apply a second transformation $\underline{u}_i$, to compute $(X_i, Y_i)$ from $(X_{(i-1)}, Y_{(i-1)})$, such that $(X_i, Y_i)=u_i(X_{(i-1)}, Y_{(i-1)})$; and configuring the processor to apply a third transformation G that depends on $X_{(n-1)}, Y_{(n-1)}$, and r, by computing $w_n=G(X_{(i-1)}, Y_{(i-1)}, r)$, to obtain the secure outcome, wherein $w_n=T_n \circ \ldots \circ T_1(w_0)$, the third transformation being performed by applying a fourth transformation $u_n$ such that $X_n=u_n(X_{(n-1)}, Y_{(n-1)})$, and a fifth transformation F that depends on $X_n$ and r, by computing $w_n=F(X_n,r)$, to obtain the value of $w_n$; and outputting of the secure outcome, wherein $(X_i, Y_i)=\Psi_i(w_i, \sigma_i)$, for i=0,1, . . . ,n, wherein $\Psi\_i$ is a predefined obfuscation function that defines a one-to-one relation between $(X_i, Y_i)$ and $(w_i, \sigma_i)$, $w_i$ being processed data and $\sigma_i$ being redundant state variable for obfuscating $w_i$, and wherein $\Psi_i$ satisfies a condition that there is a one-to-one mapping that maps any value of $(X_i, \sigma_i)$ to a value of $(w_i, Y_i)$ in such a way that $(X_i, Y_i)=\Psi_i(w_i, \sigma_i)$ such that a change of $X_i$ or $Y_i$ causes a change of the redundant state variable $\sigma_i$ and makes unpredictable the secure outcome of the sequence of transformations $w_n$, wherein $\sigma_0$ depends on r, wherein $w_i=T_i(w_{(i-1)\ and\ \sigma i}=g_i\ (\sigma_{(i-1)})$ for i=1, . . . ,n for predetermined functions $T_i$ and $g_i$, and wherein the first transformation means, the second transformation means, and the third transformation means are configured to obfuscate the values of $w_1, \ldots, w_{(n-1)}$ and $\sigma_0, \ldots \sigma_n$.

8. The method of claim 7, wherein r equals $w_0$, and wherein the act of configuring the processor to apply the first transformation comprises computing at least one look-up table representing a mapping of values of $w_0$ to corresponding values of $(X_0, Y_0)$.

9. The method of claim 7, wherein the act of configuring the processor to apply the second transformation comprises computing at least one look-up table of at least one of the functions $\underline{u}_i$, wherein the look-up table maps values of $(X_{(i-1)}, Y_{(i-1)})$ to values of $(X_i, Y_i)$, by computing $(X_i, Y_i)=u_i(X_{(i-1)}, Y_{(i-1)})=\Psi_i(T_i(\Psi_{(i-1)}^{inverse}(X_{(i-1)}, Y_{(i-1)})), g_i(\Psi(i-1)^{inverse}(X_{(i-1)}, Y_{(i-1)})))$, wherein $\Psi_{(i-1)}^{inverse}$ is an inverse of $\Psi_{(i-1)}$.

10. The method of claim 7, wherein $(X_I, Y_I)=\Psi_i(w_I, \sigma_I)$ is defined as follows:

$$X_i=\Psi_i^X(A_i(\varphi_i^1(w_i))\oplus B_i(\varphi_i^2(\sigma_i)))$$

$$Y_i=\Psi_i^Y(C_i(\varphi_i^1(w_i))\oplus D_i(\varphi_i^2(\sigma_i)))$$

Wherein $\oplus$ is an operator, $A_i$, $B_i$, $C_i$, and $D_i$ are operators that are linear with respect to the operator $\oplus$, the operators $A_n$ and $D_n$ are invertible, and an operator $E_i$ that maps (u,v) to $(A_i(u)\oplus B_i(v), C_i(u)\oplus D_i(v))$ is invertible; and $\Psi_i^X$, $\Psi_i^Y$, $\varphi_i^1$, and $\varphi_i^2$ are invertible mappings; and wherein the act of configuring the processor to apply the second transformation comprises computing at least one look-up table of at least one of the functions $\underline{u}_i$, wherein the look-up table maps values of $(X_{(i-1)}, Y_{(i-1)})$ to values of $(X_i, Y_i)$, by computing $(X_i, Y_i)=u_i(X_{(i-1)}, Y_{(i-1)})=f_i(T_i(f_{(i-1)}^{inverse}(X_{(i-1)}, Y_{(i-1)})), g_i(f_{(i-1)}^{inverse}(X_{(i-1)}, Y_{(i-1)})))$, wherein $f_i$ denotes a function defined by $f_i(w_i, \sigma_i)=(\Psi_i^X(A_i(\varphi_i^1(w_i))\oplus B_i(\varphi_i^2(\sigma_i))), \Psi_i^Y(C_i(\varphi^{i1}(w_i))\oplus D_i(\varphi_i^2(\sigma_i))))$, and $f_{(i-)}^{inverse}$ is an inverse of $f_{(i-)}$.

11. The method of claim 7, wherein r equals w_0, and wherein the act of configuring the processor to apply the third transformation comprises computing at least one look-up table representing the function G, wherein the at least one look-up table maps tuples of $(X_{(i-1)}, Y_{(i-1)}, w0)$ to corresponding values of $w_n=G(X_{(i-1)}, Y_{(i-1)}, w_0)$.

12. A method of secure processing of data by performing a secure sequence of n transformations $T_i$, wherein i=1, . . . ,n, to a data value to obtain a secure outcome, using encrypted representations of the data value, comprising acts of:

applying a first transformation to the data value $w_0$ to obtain an obfuscated representation $(X_0, Y_0)$ of $w_0$, wherein the obfuscated representation contains a redundancy that depends on an input variable r;

for each of i=1, . . . ,n−1, applying a second transformation $\underline{u}_i$ to compute $(X_i, Y_i)$ from $(X_{(i-1)}, Y_{(i-1)})$, such that $(X_i, Y_i)=u_i(X_{(i-1)}, Y_{(i-1)})$; and applying a third transformation G that depends on $X_{(n-1)}$, $Y_{(n-1)}$, and r, by computing $w_n=G(X_{(i-1)}, Y_{(i-1)}, r)$, to obtain the secure outcome of the sequence of transformations, wherein $w_n=T_n \circ \ldots \circ T_1(w_0)$, the third transformation being performed by applying a fourth transformation $u_n$ such that $X_n=u_n(X_{(n-1)}, Y_{(n-1)})$, and a fifth transformation F that depends on $X_n$ and r, by computing $w_n=F(X_n, r)$, to obtain the value of $w_n$; and outputting of the secure outcome, wherein $(X_i, Y_i)=\Psi_i(w_i, \sigma_i)$, for i=0,1, . . . ,n, wherein $\Psi_i$ is a predefined obfuscation function that defines a one-to-one relation between $(X_i, Y_i)$ and $(w_i, \sigma_i)$, $w_i$ being processed data and $\sigma_i$ being redundant state variable for obfuscating $w_i$, and wherein $\Psi_i$ satisfies a condition that there is a one-to-one mapping that maps any value of $(X_i, \sigma_i)$ to a value of $(w_i, Y_i)$ in such a way that $(X_i, Y_i)=\Psi_i(w_i, \sigma_i)$ such that a change of $X_i$ or $Y_i$ causes a change of the redundant state variable $\sigma_i$ and makes unpredictable the secure outcome, wherein $\sigma_0$ depends on r, and wherein $w_i=T_i(w_{(i-1)})$ and $\sigma_i=g_i(\sigma_{(i-1)})$ for i=1, . . . ,n for predetermined functions $T_i$ and $g_i$, wherein $w_1, \ldots, w_{(n-1)}$ and $\sigma_0, \ldots \sigma_n$ are obfuscated in the acts of applying the first, second and third transformations.

* * * * *